(12) United States Patent
Kuboki

(10) Patent No.: US 7,542,235 B2
(45) Date of Patent: Jun. 2, 2009

(54) PERPENDICULAR MAGNETIC RECORDING MEDIUM

(75) Inventor: Yoshiyuki Kuboki, Tokyo (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 482 days.

(21) Appl. No.: 11/370,206

(22) Filed: Mar. 7, 2006

(65) Prior Publication Data

US 2006/0228587 A1 Oct. 12, 2006

(30) Foreign Application Priority Data

Apr. 7, 2005 (JP) ............................... 2005-110431

(51) Int. Cl.
*G11B 5/667* (2006.01)
*G11B 5/82* (2006.01)

(52) U.S. Cl. ..................................... 360/135

(58) Field of Classification Search ................. 360/135; 428/826, 827, 829, 830–832.1
See application file for complete search history.

(56) References Cited

U.S. PATENT DOCUMENTS

| 7,033,685 | B2* | 4/2006 | Lee et al. ..................... 428/828 |
| 2004/0247945 | A1 | 12/2004 | Chen et al. |
| 2005/0064244 | A1* | 3/2005 | Shintaku et al. ......... 428/694 TS |
| 2005/0202286 | A1* | 9/2005 | Chen et al. .................. 428/831 |
| 2006/0199044 | A1* | 9/2006 | Thangaraj et al. ........... 428/829 |

FOREIGN PATENT DOCUMENTS

| JP | 8-273155 A | 10/1996 |
| JP | 2000-215432 A | 8/2000 |
| JP | 2002-100036 A | 4/2002 |
| JP | 2002-352408 A | 12/2002 |
| JP | 2003-223707 A | 8/2003 |
| JP | 2005-071531 A | 3/2005 |

OTHER PUBLICATIONS

Singapore Search Report with Written Opinion issued in corresponding Singapore Patent Application No.200600853-6, with mailing date Feb. 22, 2007.

(Continued)

*Primary Examiner*—William J Klimowicz
(74) *Attorney, Agent, or Firm*—Rossi, Kimms & McDowell LLP

(57) ABSTRACT

A perpendicular magnetic recording medium having a soft magnetic backing layer in which amount of cobalt elution is suppressed without imposing restraint on the construction of the protective layer is disclosed. The perpendicular magnetic recording medium of the invention comprises at least a soft magnetic backing layer, a magnetic recording layer, and a protective layer sequentially laminated on a nonmagnetic substrate, the soft magnetic backing layer containing iron and cobalt, and further containing at least two elements selected from Si, Ni, Ta, Nb, Zr, Ti, Cr, Mo, and B, and the surface roughness of the soft magnetic backing layer being in a range of 0.2 nm to 0.8 nm in center line average roughness. The iron concentration in the soft magnetic backing layer preferably is in the range of 40 at % to 85 at %, the cobalt concentration preferably is in a range of 10 at % to 45 at %, and the total concentration of Si, Ni, Ta, Nb, Zr, Ti, Cr, Mo, and B is in a range of 20 at % to 50 at %.

13 Claims, 3 Drawing Sheets

OTHER PUBLICATIONS

Relevant Portion of Singapore Search Report and Written Opinion issued in corresponding Singapore Patent Application No.200600853-6, with mailing date Feb. 22, 2007. The Search Report and Written Opinion were prepared by the Danish Patent And Trademark Office.

Cited in Office Action issued in corresponding Chinese Application No. 200610051567.7 dated Dec. 26, 2008. Parital English translation provided.

* cited by examiner

PERPENDICULAR MAGNETIC RECORDING MEDIUM

CROSS REFERENCE TO RELATED APPLICATIONS

This application is based on, and claims priority to, Japanese Application No. 2005-110431, filed on Apr. 7, 2005, the contents of which are incorporated herein by reference.

BACKGROUND OF THE INVENTION

A. Field of the Invention

The present invention relates to a perpendicular magnetic recording medium for recording and reproduction of information, in particular to a perpendicular magnetic recording medium installed in a hard disk drive (HDD).

B. Description of the Related Art

In recent years, the demand for high density recording in magnetic recording media is increasing. The magnetic recording media at present employ a longitudinal magnetic recording system in which a magnetic recording layer of a CoCr alloy or the like is provided through an underlayer of chromium, a chromium alloy or the like on a substrate, and the recording magnetization is aligned in the direction of the substrate surface. Recently, a perpendicular magnetic recording system has gained attention in which recording is performed with the axis of easy magnetization in the recording layer being aligned in the vertical direction. In either recording system, high density recording needs high thermal stability, low noise, and reduction of magnetic spacing. As a way of reducing the magnetic spacing, a protective layer formed on the magnetic recording layer is made as thin as possible. The decrease of protective layer thickness, however, causes a reliability problem due to increased elution of cobalt from the magnetic recording layer and significant deterioration of slidability. Since a soft magnetic backing layer is necessary in the perpendicular magnetic recording system, the cobalt elution becomes a more severe problem in a soft magnetic backing layer made of a cobalt-based alloy.

A means to avoid the cobalt elution caused by a thin protective layer has been proposed in which an element of the platinum group other than platinum or an element with negative electrode potential is added to the magnetic layer. (See, for example, Japanese Unexamined Patent Application Publication No. 2003-223707.) The technique of adding an element to the magnetic film is barely effective for small additions, while degradation of magnetic and electromagnetic conversion performances results from large additions of the element. The elements in the platinum group other than platinum have a large atomic radius, requiring adjustment of the composition and deposition process of the intermediate layer and the underlayer.

Another method has been proposed in which an intermediate layer after passivation treatment is provided between the magnetic layer and the protective layer. (See, for example, Japanese Unexamined Patent Application Publication No. H8-173155.) The provision of an intermediate layer, however, raises a problem of increased magnetic spacing due to the addition of this layer. Still another technique has been proposed in which chromium and hard micro particles are added in the protective layer. (See, for example, Japanese Unexamined Patent Application Publication No. 2002-100036.) However, the protective layer must perform other functions, including ensuring slidability in addition to the prevention of cobalt elution. To limit the material of the protective layer to avoid cobalt elution imposes an unfavorable restraint in achieving the best performance in other functions.

The present invention is directed to overcoming or at least reducing the effects of one or more of the problems set forth above.

SUMMARY OF THE INVENTION

The present invention has been made in view of the above problems, and an object of the invention is to provide a perpendicular magnetic recording medium having a soft magnetic backing layer exhibiting improved corrosion resistance and good read-write performance by decreasing cobalt elution without any restraint on the construction of a protective layer, including protective layer thickness, deposition process, or layer structure.

The inventors of the present invention have made extensive studies and have discovered the causes of cobalt elution due to a thin protective layer, and have accomplished the invention. In a longitudinal magnetic recording medium, grooves called a texture are generally formed in the circumferential direction on a substrate of aluminum or glass to prevent the magnetic head from adhesion and to give anisotropy of magnetic properties. Thus, irregularities are formed on the surface and the irregularities are reflected up to the magnetic layer surface. Even when the irregularities by the texturing are lowered, the layers from the underlayer to the magnetic layer are polycrystalline films and the grain boundaries are dent parts forming irregularities on the film as a whole. Regarding perpendicular magnetic recording media, the texture is not provided in most cases. Nevertheless, a granular magnetic layer of CoPtCr—$SiO_2$ (Takenoiri et al., "CoPtCr—SiO2 granular perpendicular magnetic recording medium", Journal of The Magnetic Society of Japan, Vol. 27, No. 9, p. 940-945, 2003, for example) and a magnetic film of Co/Pd artificial lattice (H. Nakagawa et al., "CoB/Pd Multilayers with PtB/Pd/MgO Intermediate Layers for Perpendicular Magnetic Recording", IEEE Trans. Magn., Vol. 39, No. 5, p. 2311-2313, 2003, for example), for example, exhibit more significant surface irregularities than the longitudinal magnetic recording media. More particularly, the inventors have discovered that a protective layer formed on a surface with such irregularities causes no problem when the film is thick, but with decrease of the film thickness the coverage deteriorates due to the surface irregularities. As a result, regions are generated that are scarcely covered by the protective layer. The cobalt elutes out through these regions. The moisture in the air and the moisture adsorbed on the protective surface penetrate through the uncovered regions and reach the recording layer and the soft magnetic backing layer causing corrosion.

Considering the above, a perpendicular magnetic recording medium of the invention comprises at least a soft magnetic backing layer, a magnetic recording layer, and a protective layer sequentially laminated on a nonmagnetic substrate, the soft magnetic backing layer containing iron and cobalt, and further containing two or more elements selected from Si, Ni, Ta, Nb, Zr, Ti, Cr, Mo, and B, and having a surface roughness of the soft magnetic backing layer in a range of 0.2 nm to 0.8 nm in center line average roughness.

Advantageously, the concentration of iron in the soft magnetic backing layer is in a range of 40 at % to 85 at %, the concentration of cobalt in the soft magnetic backing layer is in a range of 10 at % to 45 at %, and the total concentration of the Si, Ni, Ta, Nb, Zr, Ti, Cr, Mo, and B in the soft magnetic backing layer is in a range of 20 at % to 50 at %.

The thickness of the soft magnetic backing layer is in a range of 20 nm to 300 nm, and the crystal grain diameters in the soft magnetic backing layer are at most 5 nm.

According to the present invention, the cobalt elution can be decreased without restriction on the construction of a protective layer, and a perpendicular magnetic recording medium is provided having a soft magnetic backing layer exhibiting improved corrosion resistance and good read-write performance. Some preferred embodiments of the invention will be described below with reference to the accompanying drawings.

BRIEF DESCRIPTION OF THE DRAWINGS

The foregoing advantages and features of the invention will become apparent upon reference to the following detailed description and the accompanying drawings, of which.

Figure 1:
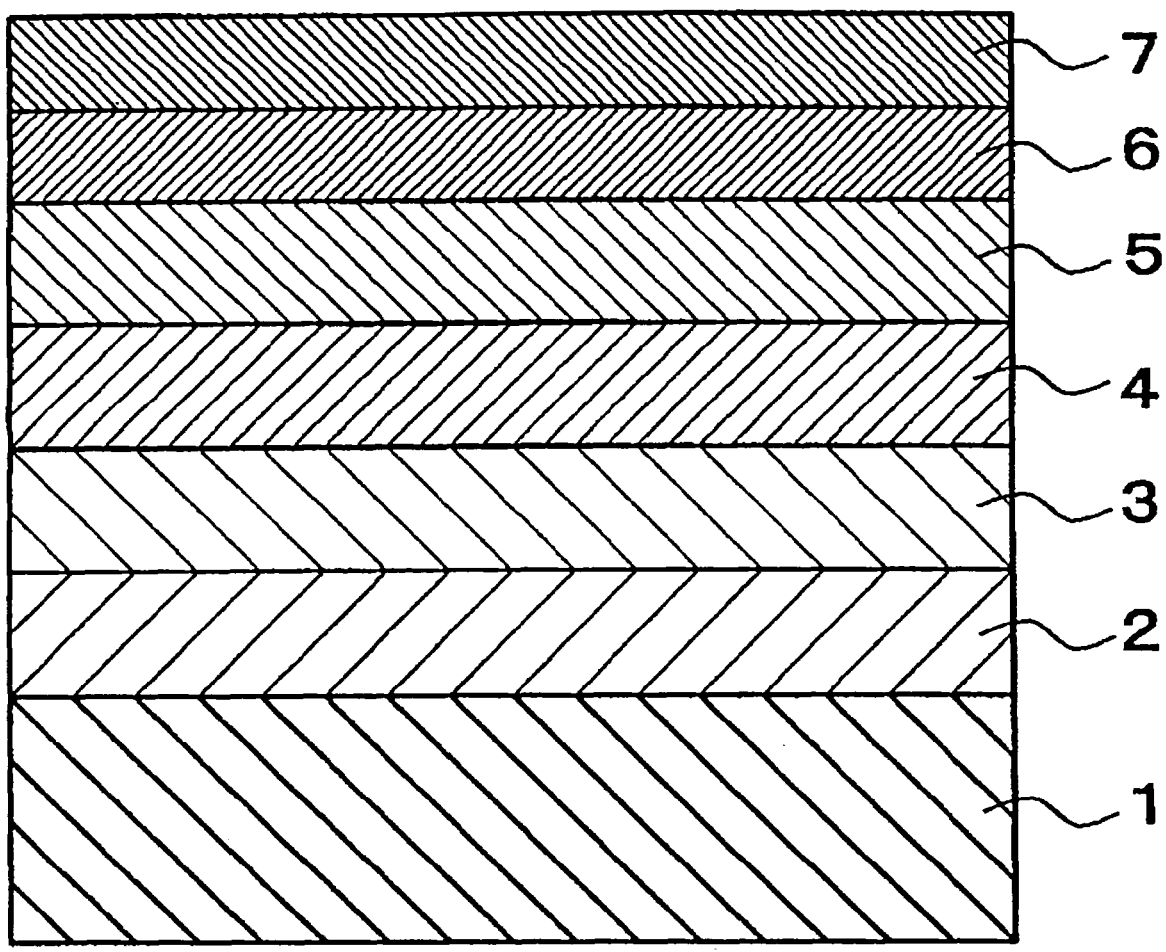
FIG. 1 is a schematic sectional view illustrating a structure of a perpendicular magnetic recording medium of an embodiment example according to the invention.

The figures employ the following reference numbers:
1 nonmagnetic substrate
2 soft magnetic backing layer
3 seed layer
4 nonmagnetic underlayer
5 magnetic recording layer
6 protective layer
7 liquid lubricant layer

DETAILED DESCRIPTION OF SPECIFIC EMBODIMENTS

FIG. 1 is a schematic sectional view illustrating a basic structure of a magnetic recording medium of an embodiment example according to the invention. The magnetic recording medium comprises soft magnetic backing layer 2, seed layer 3, nonmagnetic underlayer 4, and magnetic recording layer 5 sequentially laminated on nonmagnetic substrate 1. On magnetic recording layer 5, protective layer 6 and liquid lubricant layer 7 are formed.

The magnetic recording medium according to the invention uses an appropriate material for soft magnetic backing layer 2, thereby causing the soft magnetic backing layer to have a microcrystalline or amorphous structure. This decreases surface irregularities originated from a soft magnetic backing layer, and thus suppresses cobalt elution. Therefore, improvement in corrosion resistance and good read-write performance are achieved without restrictions on the protective layer such as thickness, deposition process, and layer structure.

Nonmagnetic substrate 1 can be composed of a material commonly used in magnetic recording media, for example, NiP-plated aluminum alloy, strengthened glass, or crystallized glass. If the substrate temperature is confined within 100° C., a plastic substrate of polycarbonate resin or polyolefin resin can also be used.

Soft magnetic backing layer 2 prevents the magnetic flux generated by the magnetic head upon recording from diversion, to ensure a vertical magnetic field. As the material of the soft magnetic backing layer, a FeCo-based alloy provides a high Bs value. Addition of two or more elements selected from Si, Ni, Ta, Nb, Zr, Ti, Cr, Mo, and B causes the film structure to be microcrystalline or amorphous, thereby reducing the surface irregularities and coercivity. Addition of Nb, Zr, Ti, or B, in particular, is preferable for obtaining minimized crystal grains and an amorphous-like film structure. From the viewpoint of corrosion resistance, addition of an element that facilitates to form a passivation film, such as Si, Ta, Cr, or Mo, is particularly favorable. The amount of each additive element is adjusted to take into account both the soft magnetic property and the corrosion resistance.

Iron concentration is preferably in the range of 40 at % to 85 at %. Iron concentration less than 40 at % results in a small value of saturation magnetic flux density (Bs) and hardly provides good read-write performance. Iron concentration larger than 85 at %, while providing a high value of saturation magnetic flux density, results in large crystal grains in the soft magnetic backing layer and enlarges irregularities on the surface of the soft magnetic layer, thus degrades read-write performance and corrosion resistance.

Cobalt concentration is preferably in the range of 10 at % to 45 at %. The effect of cobalt is similar to the effect of iron; a cobalt concentration smaller than 10 at % results in a small value of saturation magnetic flux density (Bs) and hardly provides good read-write performance. A cobalt concentration larger than 45 at %, while providing a high value of saturation magnetic flux density, results in large crystal grains in the soft magnetic backing layer and enlarges irregularities on the surface of the soft magnetic layer, thus degrading read-write performance and corrosion resistance.

The total concentration of Si, Ni, Ta, Nb, Zr, Ti, Cr, Mo, and B is preferably in the range of 20 at % to 50 at %. A concentration smaller than 20 at % cannot provide the effects of miniaturization of crystal grains in the soft magnetic backing layer and passivation by the additive element, failing to improve corrosion resistance. A concentration larger than 50 at % results in nonmagnetic property, losing the function for a soft magnetic backing layer.

Grain diameters of the crystal grains in the soft magnetic backing layer are preferably at most 5 nm. Control of the grain diameters within 5 nm reduces the irregularities of the surface of the soft magnetic backing layer, achieving good read-write performance and corrosion resistance simultaneously.

This reduction of surface irregularities and the above-described appropriate material selection decrease the cobalt elution. In order to achieve reduced cobalt elution, the surface irregularities need to be in the range of 0.2 nm to 0.8 nm in center line average roughness (Ra), more preferably at most 0.5 nm. The thickness of the soft magnetic backing layer, while adjusted corresponding to the structure and characteristics of the magnetic head used for recording, needs to be at least 20 nm for obtaining satisfactory soft magnetic performance, but preferably at most 300 nm in view of productivity.

Seed layer 3 is preferably provided to control alignment and grain diameter of nonmagnetic underlayer 4, which is formed on the seed layer. Seed layer 3 is preferably composed of a material having an fcc structure or an hcp structure to obtain good vertical alignment in magnetic recording layer 5 as well as to improve alignment of nonmagnetic underlayer 4. A material that can be used in the seed layer is a Permalloy material with an fcc structure, for example NiFeAl, NiFeSi, NiFeNb, NiFeB, NiFeNbB, NiFeMo, or NiFeCr. A thickness of seed layer 3 is adjusted to obtain desired values of magnetic properties of magnetic recording layer 5 and read-write performance, and preferably is in the range of 2 nm to 20 nm. A thickness thinner than 2 nm deteriorates alignment in nonmagnetic underlayer 4 and magnetic recording layer 5; a thickness thicker than 20 nm results in large grain diameter in seed layer 3 and large grain diameter also in magnetic recording layer 5 through nonmagnetic underlayer 4, degrading read-write performance.

Nonmagnetic underlayer 4 provides alignment improvement and grain diameter control of magnetic recording layer 5 and suppression of occurrence of initial layer in the magnetic recording layer. Nonmagnetic underlayer 4 is preferably composed of a material having an hcp structure such as Ru, Re, Ti, Zr, Nd, Tm, or Hf. The thickness of nonmagnetic underlayer 4 is preferably in the range of 3 nm to 20 nm. A thickness thinner than 3 nm fails to achieve good crystallinity degrading alignment in the underlayer, resulting in deterioration of alignment and isolation between crystal grains in magnetic recording layer 5. Furthermore, a thin underlayer promotes formation of an initial growth layer in magnetic recording layer 5. A thickness thicker than 20 nm swells the grain diameters in nonmagnetic underlayer 4 and as a result, also swells the grain diameters of magnetic layer 5, increasing noise.

Magnetic recording layer 5 records information. A magnetic recording layer for use in a perpendicular magnetic recording medium must have its axis of easy magnetization aligning vertical to the substrate surface. In particular, the hcp (002) plane preferably aligns parallel to the substrate surface. Magnetic layer 5 preferably has a so-called granular structure, in which ferromagnetic crystal grains of cobalt-based alloy are surrounded by nonmagnetic grain boundaries mainly composed of oxide. The granular structure can reduce noise. The wording "mainly composed of" shall not exclude inclusion of small amounts of other components, and means that the oxide exists in the composition of more than about 90 mol % in the nonmagnetic grain boundary.

A cobalt-based alloy composing the ferromagnetic crystal grains can be selected from CoPt-based alloys such as CoPtCr, CoPt, CoPtSi, and CoPtCrB, and CoCr-based alloys such as CoCr, CoCrTa, and CoCrTaPt. A CoPt-based alloy is favorable in particular because a Ku value can be set at a high value.

The oxide is preferably selected from $SiO_2$, $Cr_2O_3$, $ZrO_2$, and $Al_2O_3$, which exhibit good magnetic isolation ability between the ferromagnetic crystal grains of the Co-based alloy. $SiO_2$ is particularly favorable because of excellent magnetic isolation ability between ferromagnetic crystal grains of a CoPt-based alloy.

Protective layer 6 can be a commonly used protective layer, for example, a protective layer mainly composed of carbon. The thickness of protective layer 6 can be a thickness employed in common magnetic recording media.

Lubricant layer 7 can also be composed of a commonly used material, for example, a perfluoropolyether lubricant. The thickness of lubricant layer 7 can be a thickness employed in common magnetic recording media.

Some embodiment examples according to the invention will be described in the following. The embodiment examples are merely typical examples for illustrating the present invention and shall not limit the invention.

EXAMPLE 1

Perpendicular magnetic recording media of Example 1, Comparative Example 1, Comparative Example 2, and Comparative Example 3 were manufactured in the structure of FIG. 1 with varying additive elements and thickness of the soft magnetic backing layer.

A chemically-strengthened glass substrate (N-10 glass substrate manufactured by HOYA Corporation) with a diameter of 65 mm and a thickness of 0.635 mm was used for nonmagnetic substrate 1. After cleaning, the substrate was introduced into a sputtering apparatus and soft magnetic backing layer 2 of FeCoNbMoB 200 nm thick was formed using a target of Fe20Co12Nb10Mo8B. (Each numeral represents the content in at % of the following element, indicating 20 at % of Co, 12 at % of Nb, 10 at % of Mo, 8 at % of B and the balance of iron; the same representation is valid in the following description.) Subsequently, seed layer 3 having a thickness of 5 nm was formed using a target of Ni12Fe8B, and then nonmagnetic underlayer 4 having a thickness of 10 nm was formed using a ruthenium target under an argon gas pressure of 4.0 Pa. Following this, magnetic layer 5 having a thickness of 15 nm was formed using a target of 90 mol % (Co8Cr16Pt)-10 mol % $SiO_2$ under an argon gas pressure of 4.0 Pa, and then carbon protective layer 6 having a thickness of 5 nm was formed by means of a CVD method. Then, the substrate having these layers was taken out from the vacuum chamber. The processes to deposit these layers were conducted by means of DC magnetron sputtering, with the exception of the carbon protective layer. After this, liquid lubricant layer 7 of perfluoropolyether 2 nm thick was formed by means of a dipping method. Thus, a perpendicular magnetic recording medium of Example 1 was manufactured.

COMPARATIVE EXAMPLE 1

A perpendicular magnetic recording medium of Comparative Example 1 was manufactured in the same manner as in Example 1 except that the composition of the target for soft magnetic backing layer 2 was Co8Zr5Nb.

COMPARATIVE EXAMPLE 2

A perpendicular magnetic recording medium of Comparative Example 2 was manufactured in the same manner as in Example 1 except that the composition of the target for soft magnetic backing layer 2 was Fe20Co10Ti.

COMPARATIVE EXAMPLE 3

A perpendicular magnetic recording medium of Comparative Example 3 was manufactured in the same manner as in Example 1 except that the thickness of soft magnetic backing layer 2 was 15 nm.

EXAMPLE 2

The material of the soft magnetic backing layer in this example was FeCoCrMoNbB.

A perpendicular magnetic recording medium of Example 2 was manufactured in the same manner as in Example 1 except that the composition of the target for soft magnetic backing layer 2 was Fe20Co12Cr10Mo6Nb5B.

EXAMPLE 3

The material of the soft magnetic backing layer in this example was FeCoTaTiCrNb.

A perpendicular magnetic recording medium of Example 3 was manufactured in the same manner as in Example 1 except that the composition of the target for soft magnetic backing layer 2 was Fe15Co12Ta10Ti10Cr8Nb.

EXAMPLE 4

The molybdenum content of the soft magnetic backing layer was changed in this example.

A perpendicular magnetic recording medium of Example 4 was manufactured in the same manner as in Example 1 except that the composition of the target for soft magnetic backing layer was Fe17Co15Mo10Nb8B.

EXAMPLE 5

The chromium content and molybdenum content of the soft magnetic backing layer were changed in this example.

A perpendicular magnetic recording medium of Example 5 was manufactured in the same manner as in Example 1 except that the composition of the target for soft magnetic backing layer was Fe20Co15Cr12Mo6Nb5B.

RESULTS

For each Example and Comparative Example, measurements were made on the amount of eluted cobalt, SNR, the structure of the soft magnetic backing layer, and the surface roughness of the soft magnetic backing layer. The results are given in Table 1.

TABLE 1

|  | eluted cobalt (ng/cm2) | SNR (dB) | structure (*) | grain diameter (*) (nm) | surface roughness Ra (*) (nm) |
| --- | --- | --- | --- | --- | --- |
| Example 1 | 0.038 | 9.3 | polycrystalline | 3 | 0.35 |
| Example 2 | 0.045 | 9.1 | polycrystalline | 4.5 | 0.48 |
| Example 3 | 0.035 | 10 | amorphous | — | 0.25 |
| Example 4 | 0.023 | 9.7 | polycrystalline | 2 | 0.27 |
| Example 5 | 0.013 | 9.9 | amorphous | — | 0.23 |
| Comp Ex 1 | 0.58 | 10.3 | amorphous | — | 0.28 |
| Comp Ex 2 | 0.52 | 8.2 | polycrystalline | 25 | 1.53 |
| Comp Ex 3 | 0.018 | 7.3 | polycrystalline | 3 | 0.32 |

(*) of the soft magnetic backing layer

The amount of eluted cobalt was measured by ICP-MS after storing the perpendicular magnetic recording medium for 96 hours in an atmosphere at a temperature of 80° C. and a humidity of 85%. It is generally recognized that an amount of cobalt within 0.05 ng/cm$^2$ is not a problem. The SNR was measured using a spinning stand type tester equipped with a GMR head at a linear recording density of 400 kFCl.

The structure of soft magnetic backing layer was confirmed by sectional TEM observation. In cases of polycrystalline structure, the average grain diameter was measured by planar TEM observation. The surface roughness of the soft magnetic backing layer was measured in an area of 10 μm×10 μm using an atomic force microscope (AFM).

Figure 2:
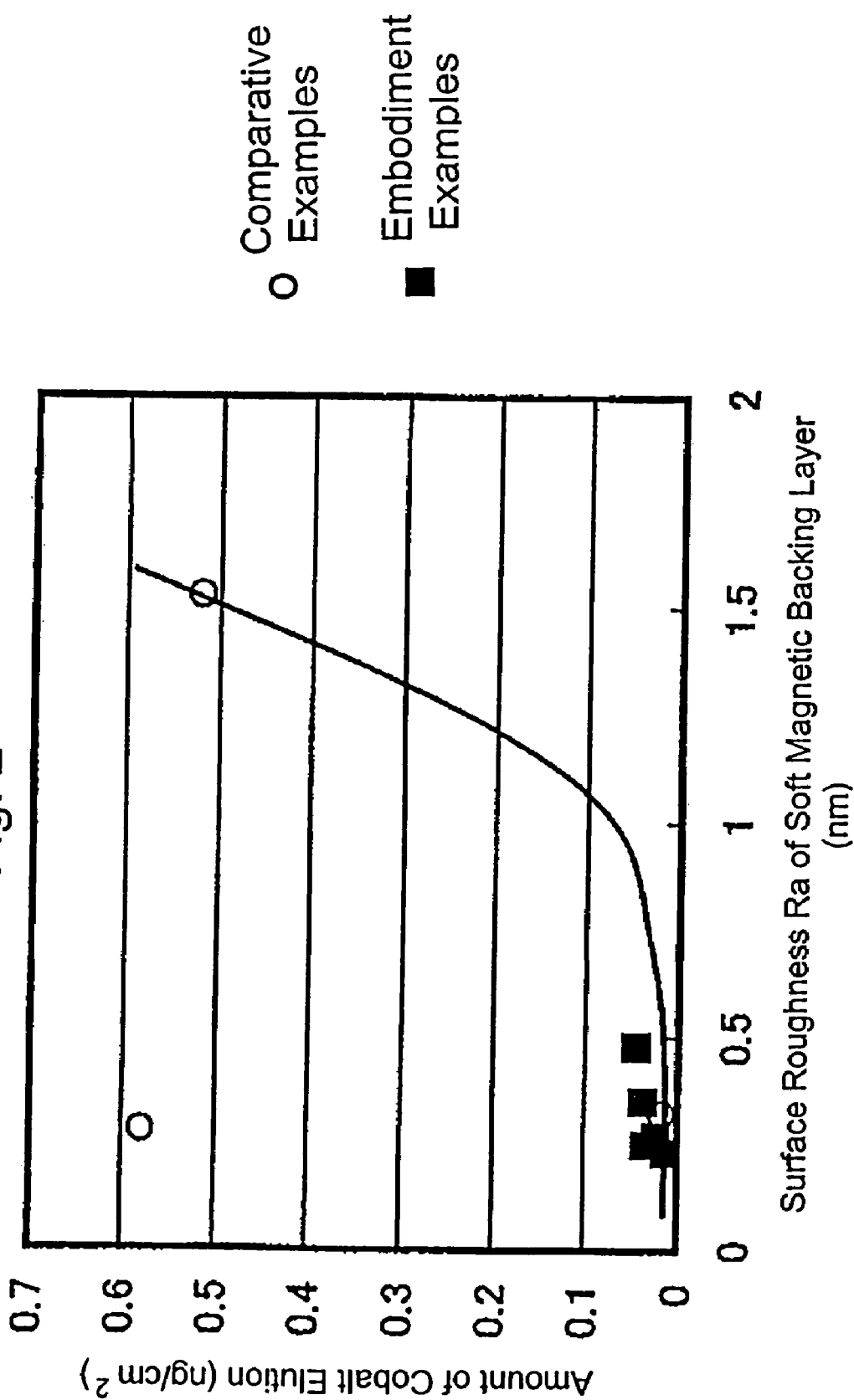
FIG. 2 is a chart illustrating a dependence of the amount of eluted cobalt on the surface roughness of the soft magnetic backing layer.
Figure 3:
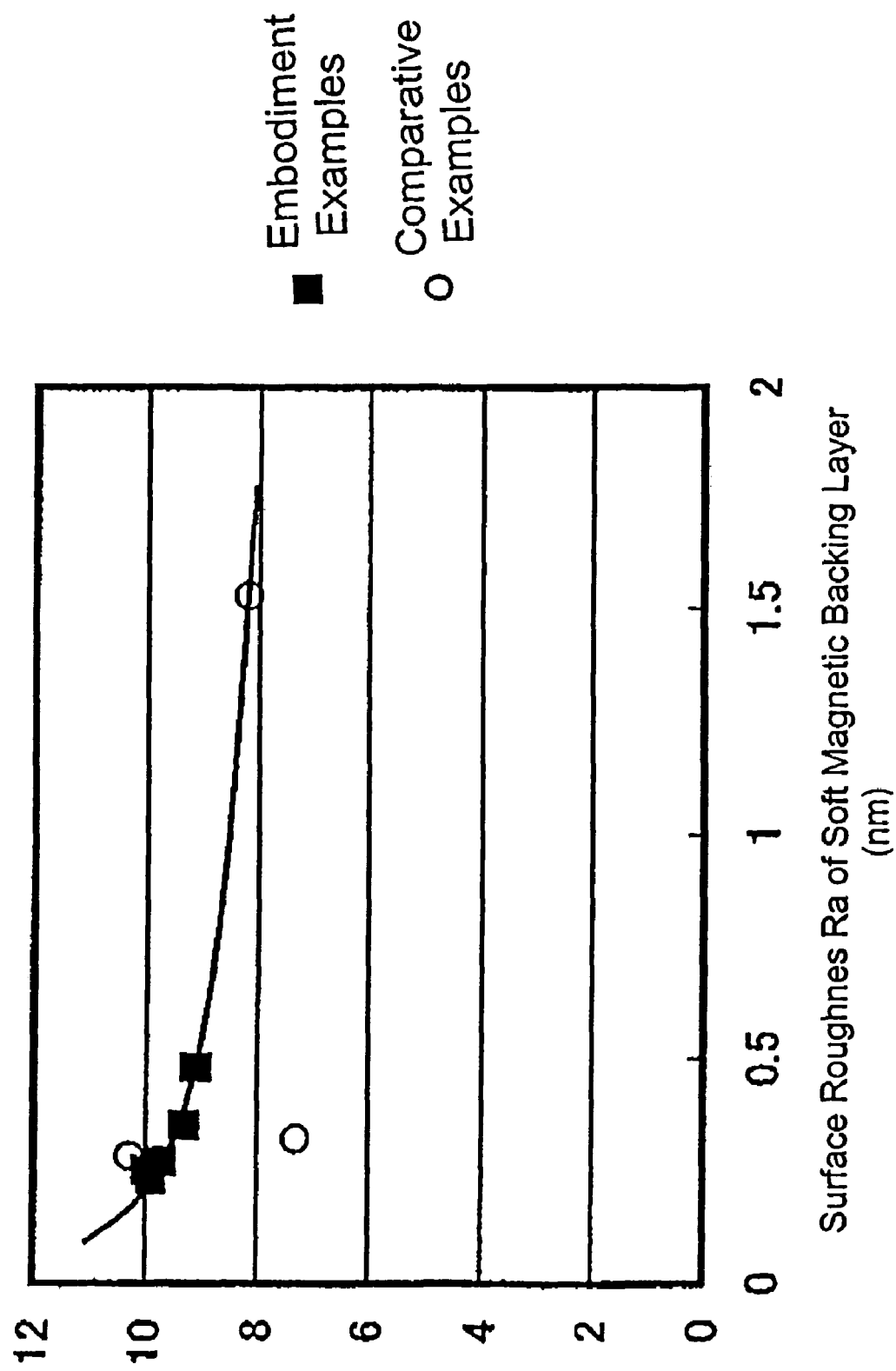
FIG. 3 is a chart illustrating a dependence of the SNR on the surface roughness of the soft magnetic backing layer.

FIG. 2 is a graph showing dependence of the amount of eluted cobalt on the surface roughness Ra of the soft magnetic backing layer for Examples 1 through 5 and Comparative Example 2. FIG. 3 is a graph showing dependence of the SNR on the surface roughness Ra of the soft magnetic backing layer. Referring to FIG. 2, it can be seen that as the surface roughness Ra increases beyond 0.8 nm, the amount of eluted cobalt rapidly increases to a practically unacceptable level. The amount of eluted cobalt remains low at Ra values in the range of 0.2 nm to 0.8 nm. In the Ra range of 0.2 nm to 0.4 nm, the amount of eluted cobalt varies depending on the structural conditions of the perpendicular magnetic recording medium, and a detailed description on this point will be given later. Referring to FIG. 3, as the surface roughness Ra of the soft magnetic backing layer increases from 0.8 nm, the SNR becomes worse. In the Ra range of 0.2 nm to 0.8 nm, the SNR is relatively large. In the Ra range of 0.2 to 0.4 nm, the SNR value varies depending on the structural conditions of the perpendicular magnetic recording medium, and detailed description on this point will be given later.

Comparing among Example 1, Comparative Example 1 and Comparative Example 2, the surface roughness Ra of the soft magnetic backing layer varies depending on the additive elements to the soft magnetic backing layer. Accompanying this variation, the performance also changes. Example 1, having surface roughness Ra of the soft magnetic backing layer of 0.35, exhibited high SNR and had an amount of cobalt elution within a tolerable range. On the other hand, Comparative Example 1 exhibited an amorphous structure in the soft magnetic backing layer and the Ra of the film surface was a small value of 0.28. The SNR was larger than in Example 1. However, the amount of cobalt elution was beyond the tolerable limit. This is caused by the absence of any element selected from Si, Ta, Cr, Mo, and Fe in the composition of the soft magnetic backing layer of Comparative Example 1, which makes it vulnerable to corrosion. The soft magnetic backing layer of Comparative Example 2 is composed of three elements and has a polycrystalline structure with large crystal grain diameter, resulting in a large Ra value of surface irregularities of 1.53. Both SNR and the amount of cobalt elution are worse than in Example 1. The degradation of SNR due to an increase of noise is caused by the increase of the surface irregularities, which resulted in degradation of vertical alignment dispersion of c-axis in the magnetic layer and degradation of isolation between crystal grains. The increase of the amount of cobalt elution can be attributed to the increase of surface irregularities of the soft magnetic backing layer, which affects the surface irregularities of the protective layer. Consequently, the coverage became worse and dew condensation was apt to occur at dent locations, which worked as a corrosion path.

Comparative Example 3 is different from Example 1 in that the thickness of the soft magnetic backing layer was decreased. The SNR was significantly decreased and the amount of cobalt elution was decreased as compared with Example 1. The degradation of SNR is caused by small reproduced output resulting from small leakage magnetic field, which is produced by a very thin film thickness of 15 nm, while the material was the same soft magnetic material as in Example 1. Regarding the amount of cobalt elution, the amount of cobalt itself to be subjected to corrosion decreased since the film thickness was thin.

Next, description will be made on Examples 2 through 5. The composition and chromium and molybdenum contents of the soft magnetic backing layer were changed in Examples 2 through 5. In every composition, the roughness Ra of the soft magnetic backing layer was in the range of 0.2 nm to 0.3 nm and the amount of cobalt elution was suppressed within the tolerable limit. The amounts of eluted cobalt were less than in Example 1, showing favorable corrosion resistance. Addition of a relatively large amount of molybdenum or chromium as in Examples 4 and 5 remarkably reduced the amount of cobalt elution, demonstrating that addition of molybdenum and chromium can suppress cobalt elution. Some differences can be seen in the SNR. The films exhibiting favorable SNR generally have a soft magnetic backing layer with fine grain diameter or amorphous structure and exhibit a small value of surface roughness Ra of the soft magnetic backing layer. Thus, the difference in SNR can be attributed to the difference in surface irregularities.

Thus, a perpendicular magnetic recording medium has been described according to the present invention. Many modifications and variations may be made to the techniques and structures described and illustrated herein without departing from the spirit and scope of the invention. Accordingly, it should be understood that the devices, apparatus and methods described herein are illustrative only and are not limiting upon the scope of the invention.

What is claimed is:

1. A perpendicular magnetic recording medium comprising:
    a soft magnetic backing layer containing iron and cobalt, and further containing at least two elements selected from the group consisting of Si, Ni, Ta, Nb, Zr, Ti, Cr, Mo, and B, said soft magnetic backing layer having a surface roughness in a range of 0.2 nm to 0.8 nm in center line average roughness;
    a magnetic recording layer; and
    a protective layer,
    sequentially laminated on a nonmagnetic substrate,
    wherein total concentration of Si, Ni, Ta, Nb, Zr, Ti, Cr, Mo, and B in the soft magnetic backing layer is in a range of 20 at % to 50 at %.

2. The perpendicular magnetic recording medium according to claim 1, wherein iron concentration in the soft magnetic backing layer is in a range of 40 at % to 85 at %.

3. The perpendicular magnetic recording medium according to claim 1, wherein cobalt concentration in the soft magnetic backing layer is in a range of 10 at % to 45 at %.

4. The perpendicular magnetic recording medium according to claim 2, wherein cobalt concentration in the soft magnetic backing layer is in a range of 10 at % to 45 at %.

5. The perpendicular magnetic recording medium according to claim 1, wherein a thickness of the soft magnetic backing layer is in a range of 20 nm to 300 nm.

6. The perpendicular magnetic recording medium according to claim 1, wherein grain diameters of crystal grains in the soft magnetic backing layer are at most 5 nm.

7. The perpendicular magnetic recording medium according to claim 1, wherein the at least two elements are selected from the group consisting of Nb, Zr, Ti, and B.

8. The perpendicular magnetic recording medium according to claim 1, wherein said soft magnetic backing layer has a surface roughness of at most 0.5 nm in center line average roughness.

9. The perpendicular magnetic recording medium according to claim 1, wherein said soft magnetic backing layer has a surface roughness of 0.2 to 0.3 nm in center line average roughness.

10. A perpendicular magnetic recording medium comprising:
    a soft magnetic backing layer containing iron and cobalt, and further containing at least two elements selected from the group consisting of Si, Ni, Ta, Nb, Zr, Ti, Cr, Mo, and B, said soft magnetic backing layer having a surface roughness in a range of 0.2 nm to 0.8 nm in center line average roughness;
    a magnetic recording layer; and
    a protective layer,
    sequentially laminated on a nonmagnetic substrate,
    wherein iron concentration in the soft magnetic backing layer is in a range of 40 at % to 85 at %, cobalt concentration in the soft magnetic backing layer is in a range of 10 at % to 45 at %, total concentration of Si, Ni, Ta, Nb, Zr, Ti, Cr, Mo, and B in the soft magnetic backing layer is in a range of 20 at % to 50 at %, thickness of the soft magnetic backing layer is in a range of 20 nm to 300 nm, and grain diameters of crystal grains in the soft magnetic backing layer are at most 5 nm.

11. The perpendicular magnetic recording medium according to claim 10, wherein said soft magnetic backing layer has a surface roughness of at most 0.5 nm in center line average roughness.

12. The perpendicular magnetic recording medium according to claim 10, wherein said soft magnetic backing layer has a surface roughness of 0.2 to 0.3 nm in center line average roughness.

13. A perpendicular magnetic recording medium comprising:
    a soft magnetic backing layer containing iron and cobalt, and further containing at least two elements selected from the group consisting of Si, Ni, Ta, Nb, Zr, Ti, Cr, Mo, and B, said soft magnetic backing layer having a surface roughness in a range of at least 0.5 nm to 0.8 nm in center line average roughness;
    a magnetic recording layer; and
    a protective layer,
    sequentially laminated on a nonmagnetic substrate.

* * * * *